March 24, 1964   E. P. TAUBES   3,125,940
PHOTOGRAPHIC CAMERA
Filed March 30, 1960   4 Sheets-Sheet 1

March 24, 1964     E. P. TAUBES     3,125,940
PHOTOGRAPHIC CAMERA
Filed March 30, 1960     4 Sheets-Sheet 3
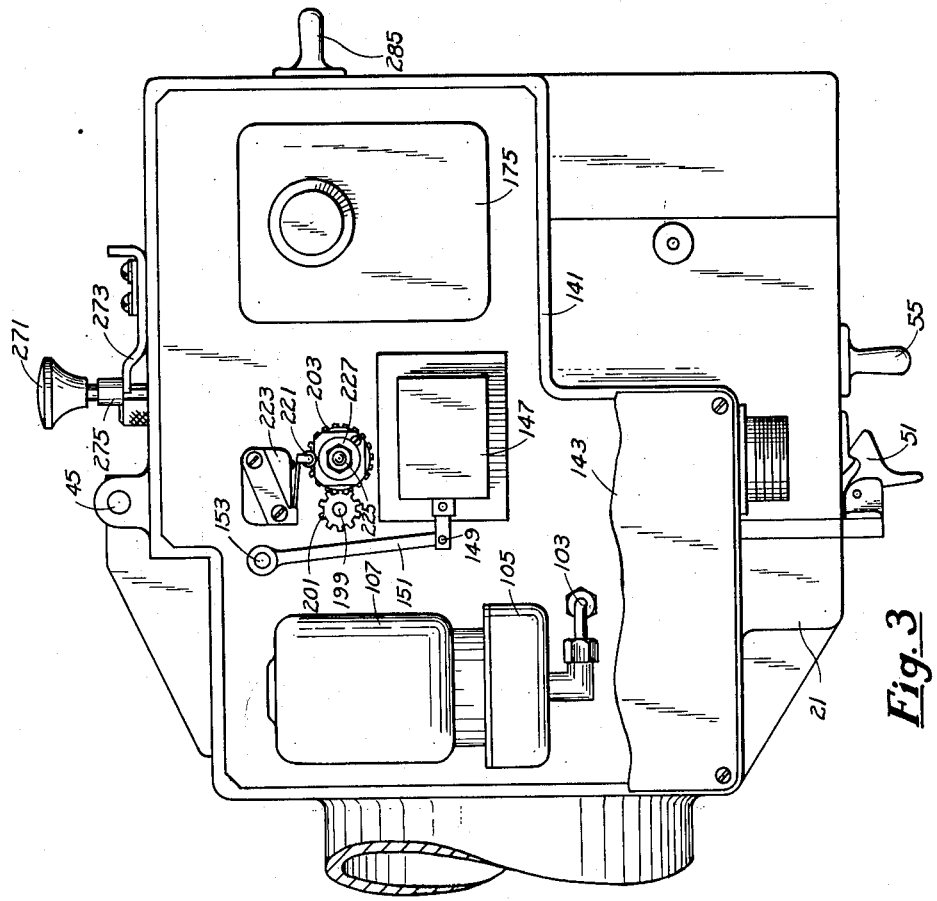
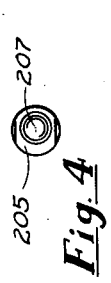
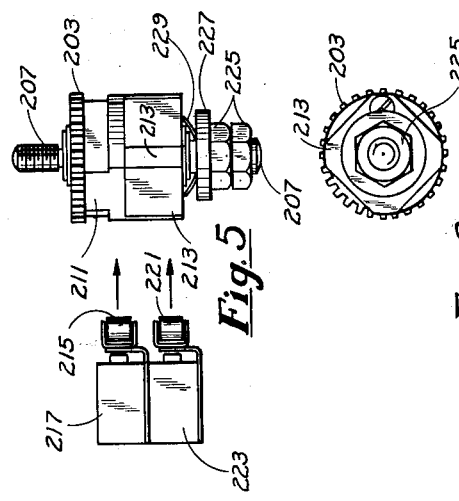
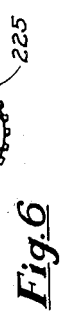

March 24, 1964    E. P. TAUBES    3,125,940
PHOTOGRAPHIC CAMERA
Filed March 30, 1960    4 Sheets-Sheet 4

United States Patent Office 3,125,940
Patented Mar. 24, 1964

3,125,940
PHOTOGRAPHIC CAMERA
Ernest P. Taubes, Rochester, N.Y., assignor, by mesne assignments, to Picker X-Ray Corporation, Waite Manufacturing Division, Inc., Cleveland, Ohio, a corporation of Ohio, and Ideax Corporation, New York, N.Y., a corporation of New York
Filed Mar. 30, 1960, Ser. No. 18,566
12 Claims. (Cl. 95—34)

This invention relates to a photographic camera, and particularly to what may be called a fluoroscope camera, for taking pictures of the image on a fluoroscope screen of X-ray apparatus, although many of the features of the present camera may be used also in other types of cameras intended for other purposes.

An object of the invention is the provision of a generally improved and more satisfactory photographic camera.

Another object is the provision of an electrically operated camera suitable for remote control from or by other apparatus, as for example X-ray apparatus.

Still another object is the provision of an electrically operated camera having a removable magazine which may be removed from the camera and taken to a darkroom for convenience of loading and unloading of film, the camera being so constructed that all of the electrical connections are external to the magazine and no electrical parts are mounted on the magazine, thus eliminating the possibility of an electrical spark in the darkroom, which might cause fogging of the film.

A further object is the provision of a camera having various safety interlocks to prevent improper assembly or disassembly of those parts of the camera which are normally to be assembled or disassembled in the day to day operation of the camera.

A still further object is the provision of a camera so designed and constructed as to prevent or impede meddling by bystanders, which might otherwise occur in a clinic, for example, if patients are standing around the camera and the attendant is temporarily absent.

These and other desirable objects may be attained in the manner disclosed as an illustrative embodiment of the invention in the following description and in the accompanying drawings forming a part hereof, in which:

FIG. 3 is a side elevation from the side opposite to that shown in FIG. 1;

FIG. 4 is a detail of an eccentric shaft forming part of the assembly shown in FIG. 5;

FIG. 5 is a top plan view of the cam assembly and associated microswitches operated thereby;

FIG. 6 is an end view of the same;

The same reference numerals throughout the several views indicate the same parts.

Figure 1:
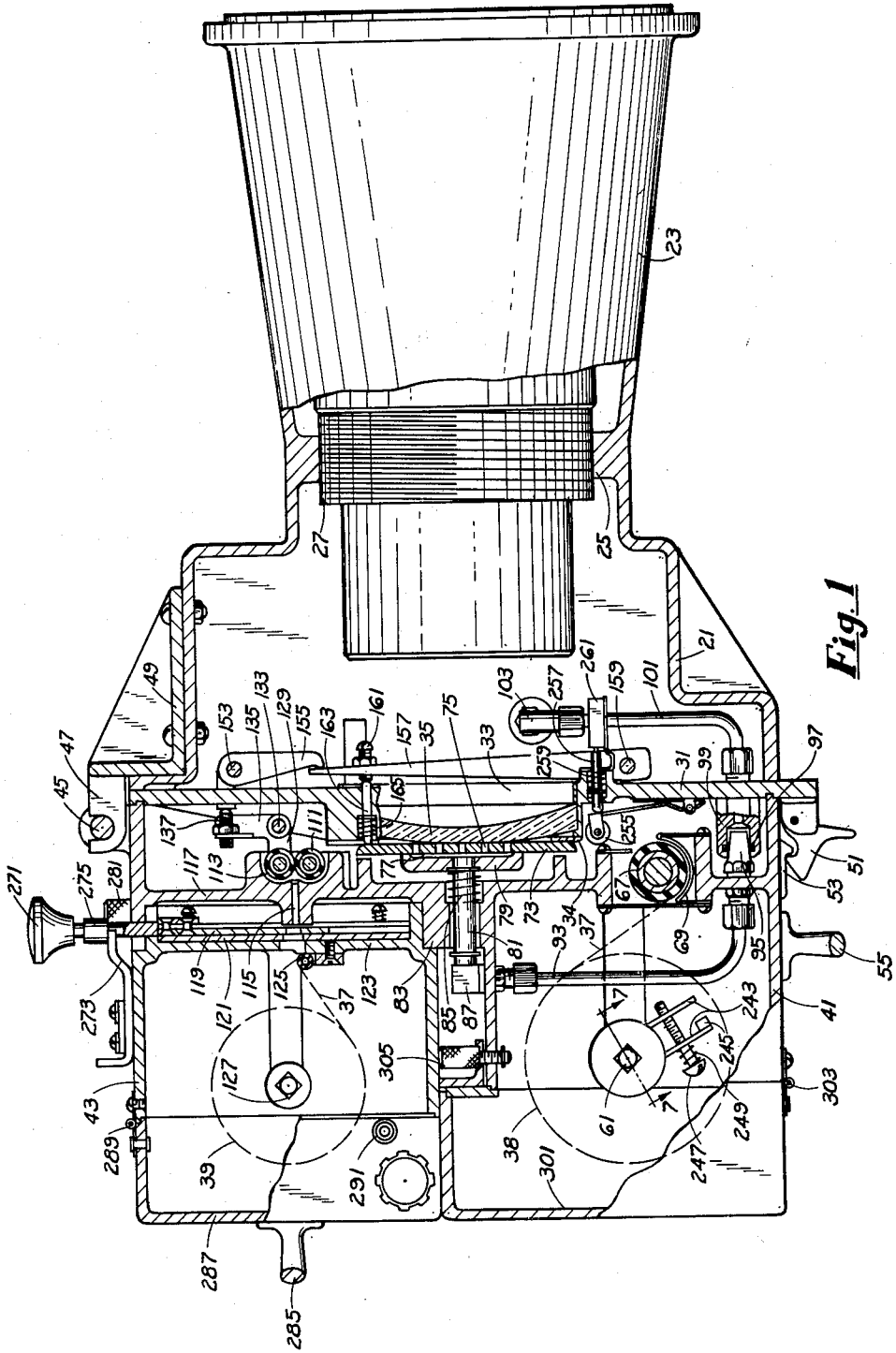
FIG. 1 is a side elevation of a camera according to a preferred embodiment of the invention, with parts in vertical section taken approximately centrally.

The camera comprises in general, a main body section 21 having a forwardly extending tubular portion 23 normally extending horizontally and pointed toward the object to be photographed, such as a fluorescent screen of X-ray apparatus. A partition 25 is internally threaded to receive the external screw threads on the optical unit 27 containing the lens or objective and also containing a shutter, if desired, although in the preferred construction designed for use with an X-ray fluoroscope screen there is no shutter because the conical tube 23 connects in a light-tight manner with the conical tube of the fluoroscope screen. The details of the lens, and of the shutter if there is one, are not important for purposes of the present invention. The optical axis of the camera normally is horizontal, passing centrally through the optical unit 27 and the cone tube 23, and the camera body is normally supported in fixed position at the desired proximity to the fluorescent screen whose image is to be photographed.

At the rear of the main body portion 21 is a stationary vertical partition member 31 containing a central opening 33 at the rear end of which is a replaceable aperture plate 34, the central rectangular aperture of which determines the area of the film which will be exposed at each cycle of operation of the camera. In the exposure opening 33 there is mounted a field flattening lens 35, the rear face of which lens, in its central region, is close to but just ahead of the vertical plane of the rear face of the aperture plate 34.

The film supply roll 38 and film take-up roll 39 are both located within a magazine assembly detachably mounted on the main camera body 21, the magazine assembly in turn being subdivided into two separate sections 41 and 43 which may be respectively called the supply magazine and the take-up magazine.

The supply magazine 41 is the larger and principal one of these two magazine sections, and is detachably hinged to the camera body by hinge pins 45 which rest in open-top sockets or grooves in hinge brackets 47 secured to an angle member 49 rigidly attached to the top of the main camera body section 21.

The second or take-up magazine section 43 is supported from the supply magazine section 41, so that for certain purposes the two magazine sections act together as a unit, although for other purposes they may be separated from each other. The two magazine sections together hang down (from the pivot or hinge pins 45) just to the rear of, and make light-tight contact with the rear face of, the stationary rear wall 31 of the camera body, in a manner well illustrated in FIG. 1.

The hinge pins 45 are so placed that gravity normally tends to keep the magazine assembly in closed position, tight against the rear face of the body wall 31. However, a pivoted latch member 51 mounted on the camera body 21 at the bottom thereof, engages a keeper 53 on the magazine assembly, to hold the magazine assembly in closed position. But if the latch 51 is moved to its released position, as for example by a meddling bystander when the camera is left unattended for a moment, the magazine section still will not open by itself, since gravity keeps it closed. It can be opened when desired, by releasing the latch 51 and then grasping the handle 55 and pulling the handle rearwardly, to swing the entire magazine assembly rearwardly and upwardly, in a clockwise direction when viewed as in FIG. 1 or in a counterclockwise direction when viewed from the other side as in FIG. 3. But a meddling bystander is not likely to think of this, and moreover, the latch 51 is normally somewhat hidden from view by being approximately under the center of the bottom of the camera, in an inconspicuous location.

On one side wall of the supply magazine section 41 there is mounted the supply spool spindle 61 terminating in a squared end on which one side of a film supply spool of any convenient construction, not here shown, is mounted. The other side of the spool is mounted on a trunnion of any suitable kind, and the spool contains the above-mentioned supply roll of film, diagrammatically shown at 38. On the supply spool, the film is wound with its light-sensitive emulsion preferably on the inside face of each convolution. The film is drawn off the supply spool along a path somewhat as indicated diagrammatically by the already-mentioned broken line 37, although the exact path will vary depending upon the momentary diameter of the supply roll or film on the spool. From the supply roll, the film enters a light trap formed by the rubber coated roller 67 which is rotated in a counterclockwise direction (viewed as in FIG. 1) by the travel of the film, and a curved opaque baffle member 69 which extends around approximately 100 degrees of the periphery of the roller 67, with just enough space between the baffle member and the face of the roller to prevent the emulsion side of the film from actually touching the baffle member as it travels around the roller. The film comes off the roller tangent thereto, of course, and then continues upwardly (viewed as in FIG. 1) past and to the rear of the previously mentioned aperture plate 34, and the field flattening lens 35, and just in front of the film pressure plate 73 which extends vertically and which is mounted for limited horizontal movement toward and away from the aperture plate and field flattening lens.

The central portion of the plate 73 is provided with a series of small openings 75 extending all the way through the thickness of the plate, the rear ends of the openings opening into a small vacuum chamber 77 formed by a hollowed out central portion of a backing plate 79 secured to the central part of the rear face of the pressure plate 73.

Figure 8:
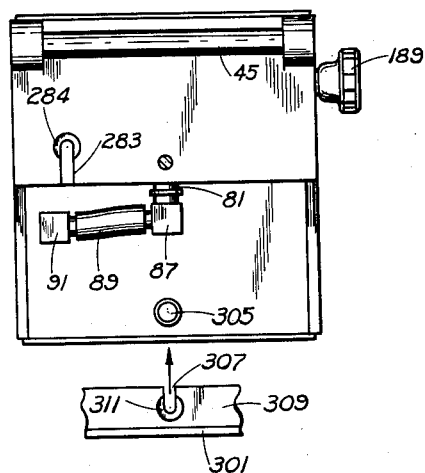
FIG. 8 is a plan of certain interior details of the construction.

Extending rearwardly from the center of the plate 79 is a vacuum conduit or tube 81, suitably guided for forward and rearward horizontal movement in a thickened wall portion 83 of the supply magazine 41, and surrounded by a spring 85 which tends to move the pressure plate assembly forwardly toward the aperture plate and the field flattening lens. The rear end of the vacuum conduit 81 has an elbow fitting 87 (see FIG. 8) connected by a short section of flexible rubber hose 89 to another elbow fitting 91 at the upper end of a vertical conduit section 93 (FIG. 1) which extends downwardly at one side of the magazine section 41 and thence forwardly through the front wall of the magazine section, terminating in a tapered nipple 95 adapted to be thrust into and to be tightly sealed by an O-ring 97 in a female nipple 99 at the end of a vacuum conduit mounted on the stationary body 21 of the camera. From this terminal nipple 99 the conduit extends at 101 forwardly and upwardly as seen in FIG. 1, and thence turns and passes out the far side wall of the body 21, as seen in FIG. 1 (or the near side wall as seen in FIG. 3) as shown at 103, and thence to a vacuum source 105 of any convenient kind, such for example as the rotary vacuum blower similar to one commonly found in a household vacuum cleaner, driven by the electric motor 107.

Continuing now with the description of the path of the film 37, it extends on upwardly from the pressure plate 73, beyond the upper edge of the pressure plate, and thence bends rearwardly and passes between two rubber coated rollers 111 and 113 which together form a light trap, and thence rearwardly through the slot 115 in the front wall section 117 of the supply magazine 41, and through alined slots in the movable knife blade 119 and the stationary knife blade 121, and a corresponding slot in the front wall 123 of the take-up magazine 43, and thence passes over the guide roller 125 within the take-up magazine 43 (with the rear face of the film in contact with the roller) and is wound onto a roll 39 on the film take-up spool (not shown) one side of which is mounted on the squared end of the take-up spindle 127 within the take-up magazine, the other side of the spool being mounted on any suitable trunnion.

The above mentioned roller 111 is the metering roller, whose revolutions determine the length of the film which is fed at each operation of the camera. The shaft of this roller rotates on a fixed axis; that is, the bearings of the shaft are in a fixed location. The companion roller 113, on the other hand, has both ends of its shaft mounted on arms 129 secured to a shaft 133, so that upon slight rotation of this shaft in one direction or the other, the roller 113 is moved toward or away from the companion roller 111. One of the arms 129 is extended at 135 to form, in effect, a bellcrank lever, having an adjusting screw 137 which makes contact with the rear face of the rear wall 31 of the camera body. The adjusting screw 137 is adjusted to such position that when the magazine assembly is in fully closed position, the pressure of the screw 137 against the camera body will hold the roller 113 pressed toward the metering roller 111 with sufficient pressure to prevent slippage of the film relative to the metering roller. When the magazine assembly is swung away from the camera body, the rearward pressure on the adjusting screw 137 is relieved, so that a spring (not shown) may open up the roller 113 to a slight space from the roller 111, to facilitate threading of the film between these rollers and into the slot 115.

The main camera body 21 is extended leftwardly (when viewed from behind the camera) somewhat beyond the left edge of the magazine sections 41 and 43. This leftward extension has housing walls 141 (FIG. 3) forming a mechanism chamber which encloses all of the electrical parts of the camera, and which is closed at its left edge by a cover plate 143 held in place by screws so that it can be removed for access to the electrical equipment for adjustment or repairs. The housing 141 rises upwardly to approximately the same elevation as the top of the magazines 41 and 43, and is slightly spaced leftwardly from them.

The above mentioned vacuum blower 105 and its motor 107 are located within this chamber defined by the walls 141 and 143. Also within this chamber is a solenoid 147, the armature of which is connected at 149 to an arm 151 secured to a shaft 153 which passes rightwardly from the electrical mechanism chamber into the main body 21 of the camera (see FIG. 1) and is there provided with an arm 155 bearing on the upper end of an arm 157 secured to a cross shaft 159. The arm 157 is located a little to the left of the exposure aperture 33, and another arm (not shown) also fixed to the shaft 159 is located a little to the right of the exposure aperture. The arm 157 carries an adjusting screw 161 bearing against a pin 163 movable longitudinally forwardly and backwardly and constantly pressed forwardly by light springs 165. The rear end of the pin engages the front face of the pressure plate 73 near one corner thereof. The other arm (not shown) on the shaft 159 has a similar adjusting screw cooperating with a similar pressure pin engaging the pressure plate 73 at a different point, preferably at the diagonally opposite corner thereof.

When the solenoid 147 (FIG. 3) is energized, it draws its armature rearwardly, swinging the arm 151 to turn the shaft 153 in a counterclockwise direction when viewed from the left as in FIG. 3, or in a clockwise direction when viewed from the right as in FIG. 1. This causes the arm 155 to press the arm 157 rearwardly, to press the pin 163 rearwardly to move the pressure plate 73 rearwardly away from the film and against the force of its spring 85. Similarly the other arm (not shown) on the shaft 159 likewise presses its pin rearwardly to exert pressure at another point on the pressure plate 73, to move this plate rearwardly substantially parallel to itself, without tilting or cocking. The movement of the pressure plate need be only about 1/16 of an inch, to relieve pressure on the film while it is traveling. When the solenoid is de-energized, the springs 165 restore the pins 163 forwardly, and the spring 85 restores the pressure plate 73 forwardly to its effective position pressing the film against the aperture plate, the flexible hose connection 89 permitting such movement without breaking the vacuum conduit connection.

Figure 2:
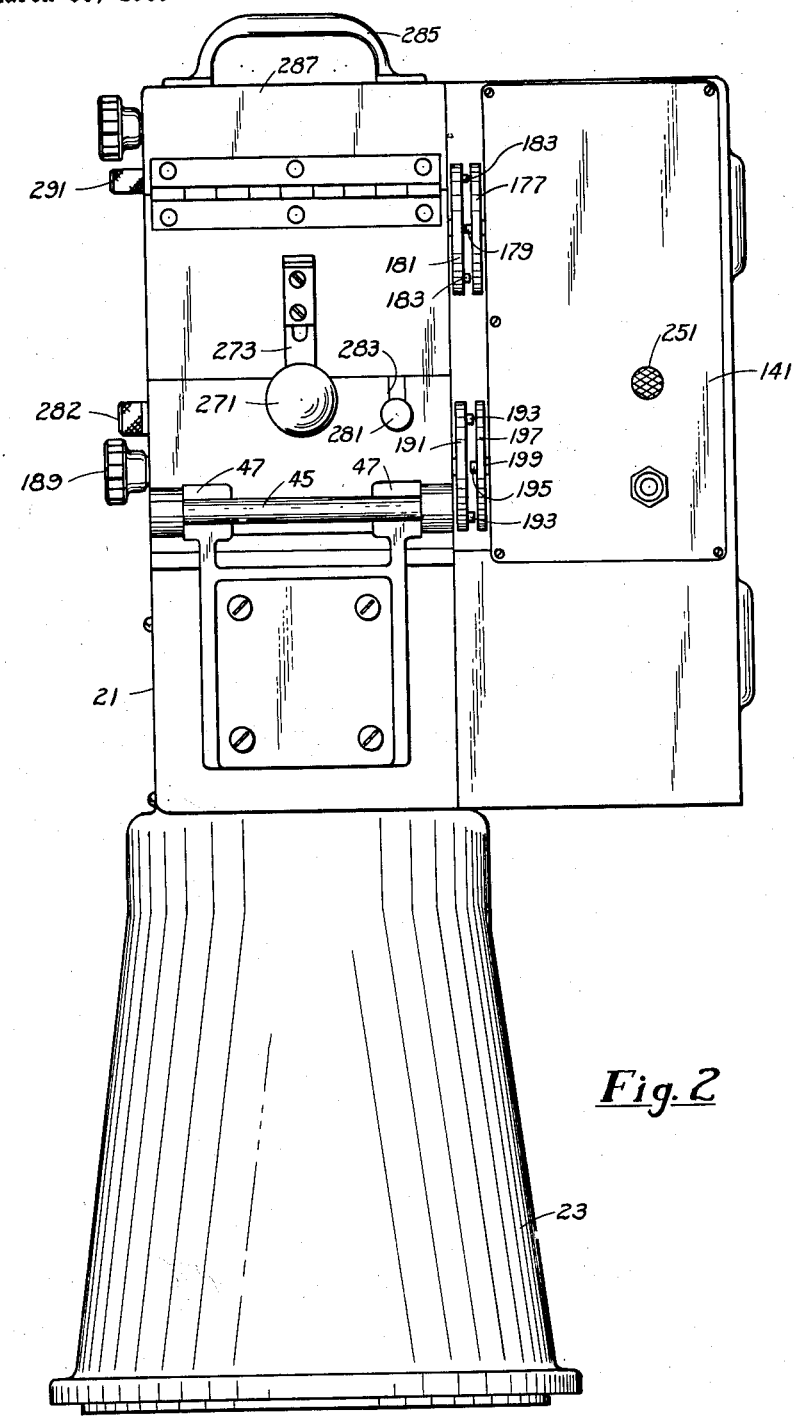
FIG. 2 is a top plan view of the camera.

In addition to the other parts already mentioned, the electrical equipment casing 141 also contains the main drive motor or film feeding motor, and an appropriate speed reduction gear, the details of which are not important for the purposes of this invention. The generally rectangular box 175 shown in FIG. 3 is intended to represent diagrammatically both the motor and the speed reduction gear. The driven shaft of the speed reduction gear is arranged horizontally and extends rightwardly (as viewed from the rear of the camera) out through the right hand wall of the electrical mechanism casing 141, where it is provided with a driving face plate or disk 177 (FIG. 2) having two projecting pins 179 projecting from the right face of the disk at diametrically opposite points. When the magazines 41 and 43 are in normal operating position on the camera, this face plate 177 is directly opposite and alined with a similar driven face plate or disk 181 located outside the left hand side wall of the take-up magazine 43, and fixed to the shaft of the take-up spindle 127, which shaft passes through this side wall. This plate or disk 181 likewise has two diametrically arranged drive pins 183 at the same radial distances from the center of rotation as the radial distance of the pins 179 on the drive disk 177.

This coupling permits the drive arrangement to be detached or reestablished with the greatest ease and without any particular attention on the part of the operator. Simply placing the take-up magazine 43 in proper position will automatically bring the disk 181 into proper relation with the disk 177, so that after a short initial rotation of the disk 177 (which in any event cannot be more than one-half a revolution) the pins 179 will engage with the pins 183 and thereafter the further rotation of the disk 177 (caused by operation of the main motor and reduction gear 175) will cause corresponding rotation of the disk 181 and of the film take-up spindle 127, to wind film onto the take-up roll. As the take-up roll 39 rotates, the film is drawn from the supply roll 38 on the supply spindle 61, around the roller 67 and through the light trap 69, past the pressure plate 73, through the nip between the metering roller 111 and its companion pressure roller 113, and past the guide roller 125 to the take-up spool.

The metering function of the roller 111 is performed as follows: The shaft of this roller extends out through both the right and left hand side wall of the take-up magazine 43. Its right end is provided with an external knob 189 which may be manually turned to advance the film during the threading operation. The left end of the shaft, outside the left side wall of the magazine, is provided with a driving disk 191 having pins 193 projecting from its face and mating with corresponding pins 195 on the face of a second or driven disk 197, the arrangement being similar to the drive disks 177 and 181 already described. The disk 197 is on a shaft 199 which extends through the right hand side wall of the electrical mechanism casing 141 and, within the casing, is provided with a pinion 201 (FIG. 3) fixed to the shaft 199 during normal operation, but detachable from the shaft for the purpose of exchanging the pinion for one of a different size, whenever it is desired to change the length of film which is fed at each picture-taking operation. This pinion 201 meshes with another pinion 203 (FIGS. 3, 5, and 6) rotatable on an eccentric sleeve 205 (FIG. 4) on a fixed shaft 207 within the casing 141.

Secured to the gear 203, and rotating with it on the eccentric sleeve 205, is a cam assembly comprising a first cam portion 211 which is circular and of uniform radius throughout most of its circumference but relieved or cut away at one point, as by means of a flat spot, and a second cam portion 213 high at four points of its periphery (90 degrees apart) and relieved or cut away by flat spots between these high points. As the cam assembly rotates, a follower roller 215 of a microswitch 217 rides on the cam portion 211, and a follower roller 221 of a microswitch 223 rides on the cam portion 213.

The sleeve 205 remains stationary on the stationary shaft 207 during rotation of the cam assembly and gear 203. The purpose of the eccentric sleeve is to enable slight changes in the center to center distance of the shaft 199 and the axis of rotation of the gear 203 (by turning the eccentric sleeve 205 to a new position of orientation) if it is necessary to do this in order to accommodate a different set or pair of gears 201 and 203, with different tooth arrangements, when it is desired to change the length of film which is fed at each operation.

The stationary shaft 207 is extended leftwardly beyond the cam assembly, and the end of the shaft carries lock nuts 225 engaging a disk 227 which holds a leaf spring 229 in bearing relation against the end of the cam assembly, to act as a frictional brake to prevent overrunning of the cam assembly because of momentum, when the driving motor stops. The nuts 225 can be adjusted to produce just the right amount of tension or force on the spring 229 to prevent overrunning when the drive stops, without exerting too much force which might cause the advancing film to slip on the metering roller 111 instead of turning this roller as it should.

Figure 7:
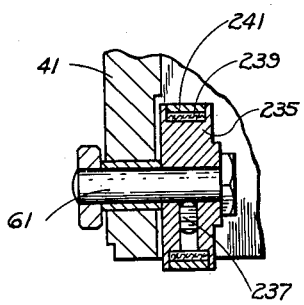
FIG. 7 is a fragmentary section taken approximately on the line 7—7 of FIG. 1.

Another frictional brake, also adjustable, is provided to prevent overrunning of the film supply roll, by reason of its momentum, when the advancing movement of the film stops. This friction brake is best shown in FIGS. 1 and 7. The spindle 61 of the film supply spool has a drum 235 fixed to it, as by means of the set screw 237. This drum 235 has a recessed circumferential groove around its periphery, which groove contains a circumferentially extending brake lining or friction material 239, partially surrounded by a brake band in the form of a metallic strap 241, the ends of which form legs which extend approximately radially outwardly at 243 and loosely embrace between them a fixed pin 245 on the side wall of the magazine 41. An adjusting screw 247 extends freely through a hole in one of the legs 243 of the brake band and is threaded through the other leg, and a spring 249 surrounds the screw 247 between the head thereof and the first leg 243, to tend to press the two legs of the brake band together by a force which is adjustable by screwing the spring 247 further in or out of the second leg. Thus by adjusting the screw 247, any desired degree of frictional retardation can be applied to the spindle 61 of the film supply roll, to stop the spindle without overrunning when the advancing movement of the film stops. As the spindle turns during withdrawal of the film from the roll, the brake band 241, 243 cannot turn (more than a small fraction of a revolution) because one of the arms 243 comes against the fixed pin 245.

Through various conventional electrical circuits and relays, well known in themselves, the details of which are not important for purposes of the present invention, the microswitches 217 and 223, the solenoid 147, the vacuum motor 107, and the main or film feeding motor 175, and other necessary conventional parts, are electrically connected to give the following result:

When the exposure sequence is to be initiated (either upon pressing a local button, for example, located on the camera, or by operation of the X-ray apparatus whose results are to be photographed by the camera) the vacuum motor 107 is started to produce vacuum to pull the film flat against the pressure plate 73 which constitutes the focal plane support, and then the X-ray apparatus is operated to make the fluorescent screen glow with the desired X-ray image. This is timed by the conventional X-ray timer. Light from the screen enters the camera through the cone 23 and exposes the film area within the aperture plate 34. At the conclusion of the X-ray interval, the fluorescent screen stops glowing, the motor 107 stops, the solenoid 147 is energized to displace the pressure plate 73 slightly rearwardly so that it will not cause a drag on the movement of the film, and the motor 175 is started to cause turning (through the coupling parts 177, 181) of the shaft or spindle 127 of the take-up spool, thereby advancing the film. As the film advances, it turns the metering roller 111. The gear 201 driven from the metering roller turns the metering gear 203. The microswitch control roller 215 rides off of the one flat spot or low point of the cam 211, thus closing the microswitch 217 to keep the motor 175 in operation (the motor circuit having been previously closed to start the motor by other means) and the motor 175 remains in operation until the metering cam 211 completes one full revolution, whereupon the low point of the cam comes under the roller 215, the microswitch 217 opens, and the motor 175 stops. Meanwhile, the various high spots and alternating low spots of the other cam 213 have moved the roller 221 back and forth to close and open the microswitch 223 to flash a suitable signal light while the film is advancing, to notify the operator that the film is still moving and that the apparatus is not yet ready to make the next exposure. This signal light may, for example, be visible through a jeweled lens 251 on the top of the casing or housing 141 of the electrical parts. When the signal light stops flashing the operator knows that the advance of the film has been completed, and the camera is ready to take another exposure whenever desired. Approximately simultaneously with stopping the motor, the solenoid 147 is deenergized so that the pressure plate 73 moves once more to its forward position, to press the film firmly against the aperture plate 34.

If the camera is to be adjusted to make exposures of a different size, a different aperture plate 34 is inserted, and the gears 201 and 203 are exchanged for other gears with different numbers of teeth, to produce the proper metering. As already mentioned, the eccentric sleeve 205 can be turned to a different position to vary the center-to-center distance of the gears slightly, as may be necessary for proper meshing.

As the film travels from the roller 67 to the aperture plate, the tightness of the film causes a forward displacement of the feeler roller 255 (FIG. 1) which in turn causes forward displacement of the plunger 257 mounted in the stationary wall 31 and normally pressed rearwardly by a spring 259. The forward displacement of the plunger serves to keep the microswitch 261 in closed position. When the supply of film is exhausted, there is no longer a tight web of film between the roller 67 and the aperture plate, so the spring 259 may press the plunger 257 rearwardly, thereby opening the microswitch 261, which is in the motor circuit, stopping the motor and operating a suitable signal to tell the operator that no more pictures may be taken until the supply of film is replenished.

The film supply magazine and the take-up magazine may be removed from the camera body together as a unit, or the take-up magazine may be separately removed while leaving the supply magazine in place, if it is desired to develop the part of the film on which exposures have already been made, without waiting to use up the rest of the supply of film. If the latter procedure is desired, an extra operating cycle of the camera is performed, after taking the last desired exposure, in order to make sure that the last exposed area or "frame" of the film has been fed beyond the metering roller 111 and back through the slot 115 to a position rearwardly of the knife 119. Then the knife is moved downwardly by downward pressure on its operating knob 271 (FIG. 1) which is held in its normal upward or open position by a horizontally sliding latch member 273 which normally engages below a collar 275 on the shaft or shank of the knob 271. By drawing the sliding latch 273 rearwardly, it is released so that downward pressure on the knob 271 will move the knife blade 119 downwardly, to sever the film by shearing action of this blade against the stationary blade 121. When the knife is all the way down, it closes the slot in the stationary knife blade 121, and thus operates as a light seal at this point. The knife is held in its downward or closed position by sliding the latch 273 forwardly again in a position above the collar 275, so that the collar and the knob cannot rise until the latch is released once more. The sliding knife 119 is mounted in spring gibs partially shown in FIG. 1, which press the sliding knife blade rearwardly to hold it tightly against the stationary knife blade 121.

The take-up magazine may now be removed from the camera and from the supply magazine, without disturbing the latter, by loosening the latching means including a latching screw 281 (FIG. 2) which extends through a slot 283 in the top wall of the supply magazine 41 and which is threaded into an underlying flange of the take-up magazine 43. The top wall of the magazine 41 has a countersink or recess 284 (FIG. 8) to receive the lower end of the head of the screw so as to hold the parts together so long as the screw is tightened enough so that the lower end of the head of the screw projects into the recess, even though the screw is not tightened all the way. There is a companion similarly constructed latching screw 282 on the right hand side of the magazines. When both are loosened enough to raise the screw heads out of their respective countersinks in the walls of the supply magazine 41, the entire take-up magazine 43 may be pulled rearwardly by means of a handle 285 (FIG. 1) and may be taken, still unopened, to a photographic darkroom, where the take-up magazine may be opened by unlatching a suitable latch of the rear door 287 of the magazine, which is hinged to the body of the magazine at 289. The latch of this door may be in the form of a similarly constructed latching screw 291. When the rear door is opened, the spool of exposed film may be taken out and processed, and an empty spool may be mounted in the magazine, which may then be placed back on the supply magazine 41 by a reverse procedure, this time leaving the rear door 287 of the take-up magazine 43 open so that, after the magazine is replaced, the knob 189 on the shaft of the metering roller 111 may be rotated by hand to feed an additional length of film rearwardly into the take-up magazine, where it may be attached to the take-up spool. Of course before doing this the latch 273 is released, the knob 271 is pulled upwardly to move the knife 119 to its open position, and then latch 273 is moved forwardly again to the position shown in FIG. 1, holding the knife in the open position.

When it is desired to remove the supply magazine 41 from the camera, either with the take-up magazine 43 still in place thereon, or with the take-up magazine previously removed, in either case the latch 51 is released and the handle 55 is pulled rearwardly to swing the entire magazine rearwardly and upwardly on its hinge pin 45, which may then be simply lifted up out of the grooves in the brackets 47. The swinging of the supply magazine rearwardly automatically releases the contact of the screw 137 from the wall 31 of the camera body, enabling the appropriate spring to move the roller 113 slightly away from the roller 111, opening up a slight space between them for convenience of threading the forward end of a new film into this space.

If it is desired to obtain access to the interior of the supply magazine 41, as for example to replenish the supply of unexposed film, this may be done only when the take-up magazine 43 has been removed from the supply magazine 41, because the take-up magazine normally covers the latch of the cover of the supply magazine. This cover of the supply magazine 41 is shown at 301, and is hinged to the body of the magazine at its bottom edge at 303. The latch screw 305 is of the same type of construction already described in connection with the latch screws 281 and 282; that is, the screw is threaded into a tapped opening in the wall of the magazine 41, and extends through a slot 307 (FIG. 8) in a flange 309 on the cover 301. As in connection with the previously described latch screws, there is a countersink or recess 311 in the flange 309 for receiving the lower end of the head of the screw 305, so that the cover 301 is held in closed position upon moderate tightening of the screw 305, so long as the head thereof enters the recess 311, even if the screw is not fully tightened.

Moreover, this latch screw 305 has another feature which is not present in the other latch screws 281 and 282 already mentioned. This further feature is that the latch screw 305 is so proportioned that when it is in a reasonably tight position, the top of the screw abuts against the bottom wall of the take-up magazine 43, as shown in FIG. 1. This is a safety feature, preventing the take-up magazine 43 from being attached to the supply magazine 41 unless and until the door 301 of the supply magazine has been properly latched in closed position. If the screw 305 is not reasonably tight, the top of the screw head will stick up too far and prevent the magazine 43 from being seated in proper position. Also, when the magazine 43 is in position, it completely covers the screw 305 and makes the latter completely inaccessible to tampering or mishandling.

When the supply magazine 41 is swung rearwardly away from the camera body, the tapered male nipple 95 of the vacuum conduit system pulls out of the O-ring seal 97, with no special attention on the part of the operator. When the supply magazine is put back on the camera, the tapered nipple 95 enters the O-ring seal automatically, and reestablishes the vacuum connection.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic camera comprising a body having an aperture member defining a focal plane, a film supply magazine detachably mounted on said body for holding a supply of photographic film, pressure means mounted in said supply magazine for pressing successive portions of said film against said aperture member, and a film take-up magazine detachably mounted on said supply magazine and removable as a unit therewith from said camera body and also separately removable from said supply magazine so that said take-up magazine may be separately taken to a darkroom for processing film therein, while leaving the film in the supply magazine undisturbed.

2. A photographic camera comprising a camera body, a film supply magazine detachably mounted on said body, a film take-up magazine detachably mounted on said supply magazine, said take-up magazine having an opening through which film may enter said take-up magazine from said supply magazine, and combined knife means and light trap means mounted on said take-up magazine for severing film and closing said opening against entrance of light into said take-up magazine.

3. A construction as defined in claim 2, further including a single latch member for latching said combined knife and light trap means selectively in either an open position or a closed position.

4. A photographic camera comprising a camera body having a driving motor and metering means both mounted on said body, a film supply magazine detachable from said body, a film take-up magazine detachable from said body, a film metering roller in said supply magazine, a film winding shaft in said take-up magazine, a quick detachable connection between said film metering roller in said supply magazine and said metering means on said camera body, and a second quick detachable connection between said driving motor on said camera body and said winding shaft in said take-up magazine.

5. A construction as defined in claim 4, in which at least one of said quick detachable connections is in the form of a rotary disk on said camera body, a rotary disk on the magazine, a plurality of driving pins projecting from a face of one of said disks, and a plurality of driven pins projecting from an adjacent face of the other disk in position to be engaged and driven by said driving pins.

6. A photographic camera comprising a camera body, vacuum producing means mounted on said camera body, film magazine means movably mounted on said camera body, a film pressure plate mounted within said magazine means, said pressure plate having suction openings therethrough, and vacuum conduit means operatively connecting said suction openings in said pressure plate to said vacuum producing means, said vacuum conduit means including a first section carried by said magazine means, a second section carried by said camera body, and detachable sealing coupling means operatively connecting said first section to said second section, said coupling means being automatically disconnected by moving said magazine means to inoperative position relative to said camera body and being automatically connected by moving said magazine means to effective operating position with respect to said camera body.

7. A construction as defined in claim 6, in which said sealing coupling means includes a female nipple attached to one of said conduit sections, a sealing O-ring mounted within said female nipple, and a tapered male nipple attached to the other of said conduit sections in position to enter said female nipple and make sealing contact with said O-ring when said magazine means is moved to effective operating position with respect to said camera body.

8. A photographic camera comprising a camera body, film magazine means mounted on said body for movement between an effective operating position and an inoperative position, a film metering roller mounted in said magazine means in position to engage and be turned by movement of film in said magazine means, a pressure roller for pressing film against said metering roller, said pressure roller being mounted for movement toward and away from said metering roller, and means controlled by movement of said film magazine means relative to said camera body for moving said pressure roller relative to said metering roller.

9. A photographic camera comprising a film supply magazine having a door movable between a closed position and an open position for access to the interior of said supply magazine, latching means for holding said door in closed position, and a film take-up magazine detachably mounted on said supply magazine, said take-up magazine overlying said latching means and rendering said latching means inaccessible so that said door or said supply magazine cannot be unlatched and opened so long as said take-up magazine is mounted in normal position on said supply magazine.

10. A construction as defined in claim 9, in which said latching means has a latched position and an unlatched position, and in which said latching means in unlatched position projects into space occupied by said take-up magazine when mounted in normal position on said supply magazine, so that said take-up magazine cannot be mounted on said supply magazine so long as said latching means remains in unlatched position.

11. A photographic camera comprising:
  (a) a body having an aperture member defining a focal plane;
  (b) a film supply magazine detachably connected to said body for holding a supply of photographic film;
  (c) a film take-up magazine detachably connected to said body for receiving and holding film having moved past said aperture member;
  (d) said film take-up magazine being separately disconnectable from said body without removing said supply magazine;
  (e) portions of said supply magazine being movable relative to said camera body between closed and open positions to provide access to the interior of said supply magazine;
  (f) latching means movable between first and second positions, said first position holding such movable portions in said closed position, said second position permitting said movable portions to move relative to said camera body to said open position;

(g) said take-up magazine when mounted on said body preventing movement of said latching means to said second position so that said film supply magazine cannot be disconnected so long as said take-up magazine is mounted in its normal position connected to said camera body.

12. A photographic camera comprising:
(a) a camera body having an aperture member defining a focal plane;
(b) said camera body including a rear wall oriented in a vertical plane;
(c) a film magazine unit juxta-positioned against said rear wall and making a light-tight connection with said rear wall;
(d) hinge means having first and second hinge members and pivot pin means inter-connecting said hinge members for relative pivotal movement;
(e) said first hinge member secured to said camera body and said second hinge member secured to said magazine unit for upward pivotal movement of said magazine unit relative to said rear wall; and,
(f) said pivot pins means located relative to said camera body and said magazine unit so that gravity biases said magazine unit into juxta-position against said rear wall to maintain said light-tight connection.

References Cited in the file of this patent

UNITED STATES PATENTS

| | | |
|---|---|---|
| 1,437,989 | Nelson | Dec. 5, 1922 |
| 1,532,544 | Newman | Apr. 7, 1925 |
| 1,804,680 | Fairchild | May 12, 1931 |
| 2,150,106 | Roessel | Mar. 7, 1939 |
| 2,209,178 | Taesler | July 23, 1940 |
| 2,398,133 | Cronholm | Apr. 9, 1946 |
| 2,578,283 | Bornemann et al. | Dec. 11, 1951 |
| 2,592,158 | Kirby et al. | Apr. 8, 1952 |
| 2,596,222 | Doyle et al. | May 13, 1952 |
| 2,819,663 | Lachaize | Jan. 14, 1958 |
| 2,844,991 | Badgley | July 29, 1958 |
| 3,078,771 | Robbins et al. | Feb. 26, 1963 |
| 3,081,679 | Hogan | Mar. 19, 1963 |